United States Patent
Okazaki et al.

(10) Patent No.: US 11,285,509 B2
(45) Date of Patent: Mar. 29, 2022

(54) METHOD FOR FORMING MULTILAYER COATING FILM

(71) Applicant: KANSAI PAINT CO., LTD., Hyogo (JP)

(72) Inventors: Hirokazu Okazaki, Kanagawa (JP); Tatsuo Kuramochi, Kanagawa (JP); Kenji Sakai, Kanagawa (JP); Nobuhiko Narita, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 71 days.

(21) Appl. No.: 16/962,032

(22) PCT Filed: Dec. 27, 2018

(86) PCT No.: PCT/JP2018/048029
§ 371 (c)(1),
(2) Date: Jul. 14, 2020

(87) PCT Pub. No.: WO2019/142639
PCT Pub. Date: Jul. 25, 2019

(65) Prior Publication Data
US 2020/0398308 A1    Dec. 24, 2020

(30) Foreign Application Priority Data
Jan. 16, 2018 (JP) .............................. JP2018-004661

(51) Int. Cl.
| | | |
|---|---|---|
| B05D 5/06 | (2006.01) | |
| B05D 1/36 | (2006.01) | |
| B05D 7/00 | (2006.01) | |
| C09D 7/61 | (2018.01) | |
| C09D 175/04 | (2006.01) | |

(52) U.S. Cl.
CPC ............... B05D 5/06 (2013.01); B05D 1/36 (2013.01); B05D 7/5783 (2013.01); C09D 7/61 (2018.01); C09D 175/04 (2013.01)

(58) Field of Classification Search
CPC .......... B05D 5/06; B05D 1/36; B05D 7/5783; C09D 7/61; C09D 175/04
See application file for complete search history.

(56) References Cited

U.S. PATENT DOCUMENTS

| 5,192,609 A | 3/1993 | Carroll, Jr. |
| 2016/0005187 A1* | 1/2016 | Prakash .................... G06T 7/90 356/402 |
| 2018/0193878 A1 | 7/2018 | Yamane et al. |
| 2018/0214912 A1 | 8/2018 | Itoh et al. |

FOREIGN PATENT DOCUMENTS

| EP | 1 428 584 | 6/2004 |
| EP | 2 409 782 | 1/2012 |
| EP | 2 813 829 | 12/2014 |
| EP | 3 486 291 | 5/2019 |
| EP | 3 542 909 | 9/2019 |
| JP | 2002-233815 | 8/2002 |
| JP | 2003-119417 | 4/2003 |
| JP | 2003-147274 | 5/2003 |
| JP | 2014004552 A * | 1/2014 |
| JP | 2016-138231 | 8/2016 |
| JP | 2016-221473 | 12/2016 |
| JP | 2017-019146 | 1/2017 |
| JP | 2017-30322 | 2/2017 |
| WO | 2013/118868 | 8/2013 |
| WO | 2017/022698 | 2/2017 |
| WO | 2017/111112 | 6/2017 |

OTHER PUBLICATIONS

International Search Report dated Apr. 2, 2019 in International (PCT) Application No. PCT/JP2018/048029.
Extended European Search Report dated Sep. 15, 2021 in corresponding European Patent Application No. 18901392.3.

* cited by examiner

*Primary Examiner* — Dah-Wei D. Yuan
*Assistant Examiner* — Kristen A Dagenais-Englehart
(74) *Attorney, Agent, or Firm* — Wenderoth, Lind & Ponack, L.L.P.

(57) ABSTRACT

A method for forming a multilayer coating film, the method including the following steps (1) to (3): (1) applying a colored paint (X) to a substrate to form a colored coating film whose lightness L* value in the L*a*b* color space is 5 or less, (2) applying an effect pigment dispersion (Y) to the colored coating film formed in step (1) to form an effect coating film, and (3) applying a clear paint (Z) to the effect coating film formed in step (2) to form a clear coating film, wherein the effect pigment dispersion (Y) contains water, a rheology control agent (A), and a flake-effect pigment (B), the flake-effect pigment (B) being an effect pigment in which a transparent or translucent base material is coated with a metal oxide, and the effect pigment dispersion (Y) having a solids content of 0.1 to 15 mass %; the obtained multilayer coating film has a Y value (Y5) of 50 or more, the Y value (Y5) representing a luminance in the XYZ color space based on spectral reflectance when light illuminated at an angle of 45 degrees with respect to the multilayer coating film is received at an angle of 5 degrees deviated from specular reflection light in the incident light direction; and the obtained multilayer coating film has a lightness L* value (L*25) of 25 or less in the L*a*b* color space when light illuminated at an angle of 45 degrees with respect to the multilayer coating film is received at an angle of 25 degrees deviated from specular reflection light in the incident light direction.

6 Claims, No Drawings

METHOD FOR FORMING MULTILAYER COATING FILM

TECHNICAL FIELD

The present invention relates to a method for forming a multilayer coating film capable of forming a multilayer coating film excellent in blackness and brilliance.

BACKGROUND ART

Among exterior colors of industrial products such as automobiles, black is a popular color due to its premium feeling. Additionally, metallic coating colors appear differently depending on the viewing angle; i.e., metallic coating colors have a high lightness in the highlight (when viewed at an angle substantially perpendicular to the coated plate), and greatly change from the highlight to the bottom. (when viewed obliquely from above). Such metallic colors are in high demand because of their effect of accentuating the contour of industrial products. In particular, blackened coating colors with flip-flop properties and graininess have been attracting attention.

PTL 1 discloses an effect paint composition that contains an effect pigment (A) selected from a metal-oxide-coated alumina flake pigment (A1) and a metal-oxide-coated mica pigment (A2), a carbon black pigment (B), a cellulosic resin (C), and a resin (D) other than the cellulosic resin; and that satisfies the following requirements: I. weight ratio (A)/(B)=20/80 to 80/20, II. weight ratio (C)/(D)=20/80 to 80/20, and III. weight ratio [(A)+(B)/(C)+(D)]=20/100 to 100/100. However, the coating film obtained from the effect paint composition may lack blackness.

PTL 2 and PTL 3 disclose an effect paint composition that contains a vehicle-forming resin (A), an alumina flake pigment (B), and a black pigment (0), wherein the alumina flake pigment (B) has an average particle size of 15 to 25 μm and is black in color, and the alumina flake pigment (B) contains an alumina flake base material coated with a metal oxide that contains at least partly iron titanate ($FeTiO_3$). PTL 2 and PTL 3 teach that the use of such an effect paint composition can form a metallic coating film with high flip-flop properties, graininess, and blackness. However, this coating film is unsatisfactory in luminance at an angle of 5 degrees deviated from specular reflection light in the incident light direction, which is characteristic in pearl luster.

CITATION LIST

Patent Literature

PTL 1: JP2003-119417
PTL 2: JP2016-138231
PTL 3: JP2016-221473

SUMMARY OF INVENTION

Technical Problem

An object of the present invention is to provide a method for forming a multilayer coating film that is capable of forming a multilayer coating film excellent in blackness and brilliance.

Solution to Problem

In an embodiment of the present invention, the following method is provided:

A method for forming a multilayer coating film, the method comprising the following steps (1) to (3):

(1) applying a colored paint (X) to a substrate to form a colored coating film whose lightness L* value in the L*a*b* color space is 5 or less, (2) applying an effect pigment dispersion (Y) to the colored coating film formed in step (1) to form an effect coating film, and (3) applying a clear paint (Z) to the effect coating film formed in step (2) to form a clear coating film, wherein the effect pigment dispersion (Y) contains water, a rheology control agent (A), and a flake-effect pigment (B), the flake-effect pigment (B) being an effect pigment in which a transparent or translucent base material is coated with a metal oxide, the effect pigment dispersion (Y) having a solids content of 0.1 to 15 mass %, the obtained multilayer coating film has a Y value (Y5) of 50 or more, the Y value (Y5) representing a luminance in the XYZ color space based on spectral reflectance when light illuminated at an angle of 45 degrees with respect to the multilayer coating film is received at an angle of 5 degrees deviated from specular reflection light in the incident light direction, and the obtained multilayer coating film has a lightness L* value (L*25) of 25 or less in the L*a*b* color space when light illuminated at an angle of 45 degrees with respect to the multilayer coating film is received at an angle of 25 degrees deviated from specular reflection light in the incident light direction.

Advantageous Effects of Invention

The method for forming a multilayer coating film according to the present invention can form a multilayer coating film excellent in blackness and brilliance.

DESCRIPTION OF EMBODIMENTS

Below, the method for forming a multilayer coating film according to the present invention is described in more detail.

1. Step (1)

In step (1), a colored paint (X) is applied to a substrate to form a colored coating film whose lightness L* value in the L*a*b* color space is 5 or less.

Substrate

Examples of substrates to which the effect pigment dispersion of the present invention can be applied include metals, such as iron, zinc, and aluminum; metal materials, such as alloys containing these metals; molded products of these metals; and molded products of glass, plastic, foam, and the like. To obtain substrates, these materials can be suitably subjected to degreasing treatment or surface treatment according to the material. Examples of surface treatment include phosphate treatment, chromate treatment, and composite oxide treatment. A substrate made of metal is preferably surface-treated, and has an undercoating film formed on the surface-treated metal material using, for example, a cationic electrodeposition paint. A substrate made of plastic is preferably subjected to degreasing treatment, and has a primer coating film formed on the degreased plastic material using a primer paint.

Colored Paint (X)

A colored coating film can be formed by applying a colored paint (X) to the substrate. From the standpoint of blackness of the multilayer coating film, any colored paint (X) can be used without limitation, as long as the coating film obtained by applying the colored paint (X) has a lightness L* value in the L*a*b* color space of 5 or less.

In the present invention, the L* value of the colored paint (X) is a value measured with a multi-angle spectrophotometer, by illuminating a coating film with standard illuminant D65 at an angle of 45 degrees with respect to the axis perpendicular to a target plane for measurement; and measuring the L*, a*, and b* (JIS Z 8729 (2004)) of, among reflected light, light in the direction perpendicular to the target plane for measurement (light at an angle of 45 degrees deviated from specular reflection light). Examples of multi-angle spectrophotometers for use include CM-512m3 (trade name, produced by Konica Minolta, Inc.) and MA-68II (trade name, produced by X-Rite, Inc.).

The L* value of the colored paint (X) can be measured by the following method. First, when the colored paint (X) is applied to a cured electrodeposition coating film, the colored paint (X) is also applied to a polytetrafluoroethylene plate in the same manner. Subsequently, the polytetrafluoroethylene plate is collected before the effect pigment dispersion (Y) is applied, and the colored coating film on the polytetrafluoroethylene plate is then cured. Subsequently, the cured colored coating film is peeled, collected, and placed on a gray (N-6 in the Munsell chart), cured coating film formed on a plate. Subsequently, the coating film is illuminated with standard illuminant D65 at an angle of 45 degrees with respect to the axis perpendicular to a target plane for measurement; and the L* value of, among reflected light, light in the direction perpendicular to the target plane for measurement (light received at an angle of 45 degrees deviated from specular reflection light), is measured with an MA-68II multi-angle spectrophotometer (trade name, produced by X-Rite, Inc.).

Specifically, the colored paint (X) for use may be a known thermosetting paint that contains a vehicle-forming resin, a pigment, and a solvent, such as an organic solvent and/or water, as main components. Examples of thermosetting paints include intermediate paints and base paints. When a base paint is used for the colored paint (X), the surface of the substrate to be coated may be the surface of an intermediate coating film, instead of an electrodeposition coating film.

Examples of vehicle-forming resins for use in the colored paint (X) include thermosetting resins and room-temperature-curable resins. However, from the standpoint of, for example, water resistance, chemical resistance, and weatherability, the vehicle-forming resin is preferably a thermosetting resin. The vehicle-forming resin is preferably used in combination with a base resin and a crosslinking agent.

The base resin is preferably a resin excellent in, for example, weatherability and transparency. Specific examples include acrylic resins, polyester resins, epoxy resins, and urethane resins.

Examples of acrylic resins include resins obtained by copolymerizing α,β-ethylenically unsaturated carboxylic acids, (meth)acrylic acid esters having a functional group, such as a hydroxyl group, an amide group, or a methylol group, other (meth)acrylic-acid esters, styrene, and the like.

Examples of polyester resins include polyester resins obtained by a condensation reaction of a polyhydric alcohol, such as ethylene glycol, propylene glycol, butylene glycol, 1,6-hexanediol, trimethylolpropane, and pentaerythritol, with a polyvalent carboxylic acid component, such as adipic acid, isophthalic acid, terephthalic acid, phthalic anhydride, hexahydrophthalic anhydride, and trimellitic anhydride.

Examples of epoxy resins include so-called bisphenol A-type epoxy resins produced by a condensation reaction of bisphenol A with epichlorohydrin.

Examples of urethane resins include urethane resins produced by reacting an acrylic resin, a polyester resin, or an epoxy resin as described above with a diisocyanate compound; and increasing the molecular weight.

The colored paint (X) may be an aqueous paint or a solvent-based paint. However, from the standpoint of decreased VOCs of the paint, the colored paint (X) is preferably an aqueous paint. When the colored paint (X) is an aqueous paint, the base resin can be made soluble in water or dispersed in water by using a resin containing a hydrophilic group, such as a carboxyl group, a hydroxyl group, a methylol group, an amino group, a sulfonic acid group, or a polyoxyethylene bond, most typically a carboxyl group, in an amount sufficient for making the resin soluble in water or dispersed in water; and neutralizing the hydrophilic group to form an alkali salt. The amount of the hydrophilic group (e.g., a carboxyl group) for use is not particularly limited, and can be suitably selected depending on the degree of water solubilization or aqueous dispersion. However, the amount of the hydrophilic group is typically preferably about 10 or more mg KOH/g, and more preferably 30 to 200 mg KOH/g on an acid value basis. Examples of alkaline substances for use in neutralization include sodium hydroxide, and amine compounds.

The resin described above can be dispersed in water by polymerizing the above monomer components in the presence of a surfactant and a water-soluble resin. An aqueous dispersion can also be obtained by dispersing the above resin in water, for example, in the presence of an emulsifier. In forming an aqueous dispersion, the base resin may contain no hydrophilic group described above, or may contain the above hydrophilic group in an amount less than that of the water-soluble resin.

The crosslinking agent is a component for crosslinking and curing the base resin by heating. Examples include amino resins, polyisocyanate compounds (including unblocked polyisocyanate compounds, and blocked polyisocyanate compounds), epoxy-containing compounds, carboxy-containing compounds, carbodiimide group-containing compounds, hydrazide group-containing compounds, and semicarbazide group-containing compounds. Preferable among these are amino resins reactive with hydroxyl groups, polyisocyanate compounds, and carbodiimide group-containing compounds reactive with carboxyl groups. These crosslinking agents can be used singly, or in a combination of two or more.

Specifically, amino resins obtained by condensation or co-condensation of formaldehyde with melamine, benzoguanamine, urea, or the like, with optional further etherification with a lower monohydric alcohol, are suitably used. A polyisocyanate compound can also be suitably used.

The ratio of each component in the colored paint (X) may be determined as desired. However, from the standpoint of, for example, water resistance and appearance, the ratio of the base resin is preferably 60 to 90 mass %, and more preferably 70 to 85 mass %; and the ratio of the crosslinking agent is preferably 10 to 40 mass %, and more preferably 15 to 30 mass %, both based on the total mass of the base resin and the crosslinking agent.

The pigment gives a hue and lightness to a colored coating film formed from the colored paint (X), thereby providing undercoat hiding power.

Examples of pigments include metallic pigments, rust preventive pigments, coloring pigments, and extender pigments. The type and amount of the pigment can be adjusted so that the coating film obtained from the colored paint (X) has an L* value of 5 or less. In particular, a black pigment is preferably used. A black pigment may contain, for example, one known pigment, or two or more known pigments for ink, coating compositions, or coloring plastics in combination. Examples include metal oxide complex pigments, black iron oxide pigments, black titanium oxide pigments, perylene black, carbon black, and carbon nanotubes, with carbon black being preferable from the standpoint of the color tone of the multilayer coating film.

When a black pigment is used in the colored paint (X), the colored paint (X) may contain a black pigment in an amount of preferably 0.5 parts by mass or more, more preferably 0.5 to 5 parts by mass, and particularly preferably 1 to 4 parts by mass, per 100 parts by mass of the vehicle-forming resin (solids content) from the standpoint of, for example, masking properties and blackness.

The colored paint (X) may optionally contain a black dye. An organic solvent may optionally be used in the colored paint (X). Specifically, organic solvents typically used in paints can be used. Examples include hydrocarbons, such as toluene, xylene, hexane, and heptane; esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl ether, and diethylene glycol dibutyl ether; alcohols, such as butanol, propanol, octanol, cyclohexanol, and diethylene glycol; ketones, such as methyl ethyl ketone, methyl isobutyl ketone, cyclohexanone, and isophorone; and other organic solvents. These solvents can be used singly, or in a combination of two or more.

Of these organic solvents, esters, ethers, alcohols, and ketones are preferable from the standpoint of solubility.

The thickness of the colored coating film obtained from the colored paint (X) on a cured film basis is preferably 5 μm or more, more preferably 8 to 40 μm, and still more preferably 10 to 35 μm from the standpoint of, for example, reduction of light transmittance and undercoat hiding power.

The colored paint (X) can be applied by using a typical method. When the colored paint (X) is an aqueous paint, for example, deionized water, optionally with additives, such as a thickener and an antifoaming agent, are added to the colored paint (X) so that the solids content is adjusted to about 10 to 60 mass % and the viscosity is adjusted to 200 to 5000 cps based on B6 viscosity. Then, the resulting mixture is applied to the surface of the substrate by spray-coating, rotary atomization coating, or the like. An electrostatic charge may optionally be applied during coating.

The film thickness having hiding power of color of the colored paint (X) is preferably 20 μm or less, more preferably 5 to 20 μm, and still more preferably 10 to 20 μm, from the standpoint of, for example, color stability. In this specification, the "film thickness having hiding power of color" refers to a value determined in the following manner. The monochrome checkered hiding power test paper specified in 4.1.2 of JIS K5600-4-1 is attached to a steel plate. Then, a paint is applied by inclined coating so that the film thickness continuously varies; and is dried or cured. The coating surface is then visually observed under diffused daylight, and the minimum film thickness at which the monochrome border of the checker of the hiding power test paper disappears is measured with an electromagnetic film thickness meter.

2. Step (2)

In step (2), the effect pigment dispersion (Y) is applied to the colored coating film formed in step (1) to form an effect coating film.

The colored coating film may be a cured coating film or an uncured coating film. In this specification, the phrase "cured coating film" refers to a cured and dried coating film specified in JIS K 5600-1-1; i.e., when the middle portion of the coating surface is firmly pinched with a thumb and an index finger, no mark due to a fingerprint is formed on the coating surface, and the coating film does not move; when the middle portion of the coating surface is rapidly and repeatedly rubbed by a fingertip, no abrasion is left. The phrase "uncured coating film" refers to a coating film that has yet to be cured and dried as described above; and includes coating films that are set to touch or dry to touch, as specified in JIS K 5600-1-1.

The colored coating film can be cured by using a typical heating (baking) means, such as hot-air heating, infrared heating, or high-frequency heating.

Such heating can be performed at a temperature of preferably 80 to 180° C., more preferably 100 to 170° C., and still more preferably 120 to 160° C. for preferably 10 to 60 minutes, and more preferably 15 to 40 minutes.

When the colored coating film is an uncured coating film, the colored coating film may be subjected to preheating (preliminary heating), air-blowing, and the like under such heating conditions that the colored coating film is not substantially cured, before the effect pigment dispersion (Y) is applied.

Preheating is performed by heating at a temperature of preferably 40 to 100° C., more preferably 50 to 90° C., and still more preferably 60 to 80° C. for preferably 30 seconds to 15 minutes, more preferably 1 minute to 10 minutes, and still more preferably 2 minutes to 5 minutes. Air-blowing can be performed by blowing, onto the coated surface of a substrate for 30 seconds to 15 minutes, air at a typical room temperature (ambient temperature), or air heated to 25 to 80° C.

Effect Pigment Dispersion (Y)

The effect pigment dispersion (1) contains water, a rheology control agent (A), and a flake-effect pigment (B) that is an effect pigment in which a transparent or translucent base material is coated with a metal oxide; and the effect pigment dispersion (Y) has a solids content of 0.1 to 15 mass %.

In the present specification, the transparent base material refers to a base material through which at least 90% of visible light can pass. The translucent base material refers to a base material through which at least 10% and less than 90% of visible light can pass. In the present specification, "pearl luster" refers to a texture with strong multiple reflection of illuminated light, a great change in luminance depending on the observation angle, and low graininess.

The rheology control agent (A) for use in the effect pigment dispersion (Y) may be a known rheology control agent. Examples include fine silica-based powder, mineral-based rheology control agents, atomized barium sulfate powder, polyamide-based rheology control agents, fine organic resin particle rheology control agents, diurea-based rheology control agents, urethane association-type rheology control agents, polyacrylic acid-based rheology control agents (acrylic swelling-type), and cellulose-based rheology control agents. Of these, from the standpoint of obtaining a coating film with excellent pearl luster, a mineral-based rheology control agent, a polyacrylic acid-based rheology control agent, and a cellulose-based rheology control agent are preferable for use; and a cellulose-based rheology control agent is particularly more preferable. These rheology control agents may be used singly, or in a combination of two or more.

Examples of mineral-based rheology control agents include swelling laminar silicate that has a 2:1-crystal structure. Specific examples include smectite clay minerals, such as natural or synthetic montmorillonite, saponite, hectorite, stevensite, beidellite, nontronite, bentonite, and laponite; swelling mica clay minerals, such as Na-tetrasilicic fluorine mica, Li-tetrasilicic fluorine mica, Na salt-fluorine taeniolite, and Li-fluorine taeniolite; vermiculite; substitutes and derivatives thereof; and mixtures thereof.

Examples of polyacrylic acid-based rheology control agents include sodium polyacrylate, and polyacrylic acid-(meth)acrylic acid ester copolymers.

Examples of commercially available polyacrylic acid-based rheology control agents include Primal ASE-60, Primal TT615, and Primal RM5 (trade names, produced by The Dow Chemical Company); and SN Thickener 613, SN Thickener 618, SN Thickener 630, SN Thickener 634, and SN Thickener 636 (trade names, produced by San Nopco Limited). The acid value of the solids content of the polyacrylic acid-based rheology control agent may be within the range of 30 to 300 mg KOH/g, and preferably 80 to 280 mg KOH/g.

Examples of cellulose-based rheology control agents include carboxymethylcellulose, methylcellulose, hydroxyethylcellulose, hydroxyethylmethylcellulose, hydroxypropylmethylcellulose, methylcellulose, cellulose nanofibers, and cellulose nanocrystals. Of these, from the standpoint of obtaining a coating film with excellent pearl luster, cellulose nanofibers are preferable for use.

The cellulose nanofibers may also be referred tows "cellulose nanofibrils," "fibrillated cellulose," or "nanocellulose crystals."

The cellulose nanofibers have a numerical average fiber diameter within the range of preferably 1 to 500 nm, more preferably 1 to 250 nm, and still more preferably 1 to 150 nm from the standpoint of obtaining a coating film with excellent pearl luster. The cellulose nanofibers also have a numerical average fiber length within the range of preferably 0.1 to 20 μm, more preferably 0.1 to 15 μm, and still more preferably 0.1 to 10 μm.

The numerical average fiber diameter and the numerical average fiber length are measured and calculated based on, for example, an image obtained by subjecting a sample (cellulose nanofibers diluted with water) to dispersion treatment; casting the sample on a grid coated with a carbon film that has been subjected to hydrophilic treatment; and observing the sample with a transmission electron microscope (TEM).

The cellulose nanofibers for use may be those obtained by defibrating a cellulose material, and stabilizing it in water. The cellulose material as used here refers to cellulose-main materials in various forms. Specific examples include pulp (e.g., grass plant-derived pulp, such as wood pulp, jute, Manila hemp, and kenaf); natural cellulose, such as cellulose produced by microorganisms; regenerated cellulose Obtained by dissolving cellulose in a copper-ammonia solution, a solvent of a morpholine derivative, or the like, and subjecting the dissolved cellulose to spinning; and fine cellulose obtained by subjecting the cellulose material to mechanical treatment, such as hydrolysis, alkali hydrolysis, enzymatic decomposition, blasting treatment, and vibration ball milling, to depolymerize the cellulose.

The method for defibrating the cellulose material is not particularly limited, as long as the cellulose material remains in a fibrous form. Examples of the method include mechanical defibration treatment using a homogenizer, a grinder, and the like; chemical treatment using an oxidation catalyst and the like; and biological treatment using microorganisms and the like.

Cellulose nanofibers for use include anionically modified cellulose nanofibers. Examples of anionically modified cellulose nanofibers include carboxylated cellulose nanofibers, carboxymethylated cellulose nanofibers, and phosphate group-containing cellulose nanofibers. The anionically modified cellulose nanofibers can be obtained, for example, by incorporating functional groups such as carboxyl groups, carboxymethyl groups, or phosphate groups into a cellulose material by a known method; washing the obtained modified cellulose to prepare a dispersion of the modified cellulose; and defibrating this dispersion. The carboxylated cellulose is also referred to as "oxidized cellulose."

The oxidized cellulose is obtained, for example, by oxidizing the cellulose material in water using an oxidizing agent in the presence of a compound selected from the group consisting of an N-oxyl compound, a bromide, an iodide, and a mixture thereof.

The amount of an N-oxyl compound is not particularly limited, as long as the amount is a catalytic amount that can disintegrate cellulose into nanofibers. The amount of a bromide or an iodide can be suitably selected within the range in which an oxidation reaction is promoted.

The oxidizing agent for use may be a known oxidizing agent. Examples include halogens, hypohalous acids, halous acids, perhalogenic acids, salts thereof, halogen oxides, and peroxides. It is preferable to set conditions so that the amount of carboxyl groups in oxidized cellulose is 0.2 mmol/g or more, based on the solids content by mass of the oxidized cellulose. The amount of carboxyl groups can be adjusted, for example, by performing the following: adjustment of oxidation reaction time; adjustment of oxidation reaction temperature; adjustment of pH in oxidation reaction; and adjustment of the amount of an N-oxyl compound, bromide, iodide, oxidizing agent, or the like.

The carboxymethylated cellulose can be obtained by mixing a cellulose material and a solvent; performing a mercerization treatment using 0.5 to 20-fold mols of alkali metal hydroxide per glucose residue of the cellulose material as a mercerization agent at a reaction temperature of 0 to 70° C., for a reaction time of about 15 minutes to 8 hours; and then adding thereto 0.05 to 10-fold mols of a carboxymethylating agent per glucose residue, followed by reaction at a reaction temperature of 30 to 90° C. for a reaction time of about 30 minutes to 10 hours.

The degree of substitution with carboxymethyl per glucose unit in the modified cellulose obtained by introducing carboxymethyl groups into the cellulose material is preferably 0.02 to 0.5.

The thus-obtained anionically modified cellulose can be dispersed in an aqueous solvent to form a dispersion, and the dispersion can be further defibrated. The defibration method is not particularly limited. When mechanical defibration is performed, the disintegrator for use may be any of the following: a high-speed shearing disintegrator, a collider disintegrator, a bead mill disintegrator, a high-speed rotating disintegrator, a colloid mill disintegrator, a high-pressure disintegrator, a roll mill disintegrator, and an ultrasonic disintegrator. These disintegrator may be used in a combination of two or more.

Further, cellulose obtained by neutralizing the above Oxidized cellulose with a basic neutralizer can also be suitably used as the cellulose-based rheology control agent. Neutralization using such a neutralizer improves the anti-water adhesion of cellulose-based rheology control agents, including cellulose nanofibers. The neutralizer for oxidized cellulose in the present specification is a neutralizer of an organic base that is bulkier than inorganic metallic bases, such as sodium hydroxide. Examples of preferable neutralizers include organic bases, such as quaternary ammonium salts and amines (primary amines, secondary amines, and tertiary amines). Preferable quaternary ammonium salts are quaternary ammonium hydroxides. Examples of amines include alkylamines and alcoholamines. Examples of alkylamines include N-butylamine, N-octylamine, dibutylamine, and triethylamine. Examples of alcoholamines include N-butyl ethanolamine, N-methyl ethanolamine, 2-amino-2-methyl-1-propanol, dimethylethanolamine, dibutylethanolamine, and methyldiethanolamine.

The content of the neutralizer is not particularly limited, as long as some or the entirety of the oxidized cellulose can be neutralized. The content of the neutralizer is preferably 0.2 to 1 equivalent, in terms of the neutralization equivalent based on the contained acid groups.

Examples of commercially available cellulose nanofibers include Rheocrysta (registered trademark, produced by Dai-Ichi Kogyo Seiyaku Co., Ltd.).

The content of the rheology control agent (A) in the effect pigment dispersion (Y) is preferably within the range of 2 to 270 parts by mass, more preferably 2 to 200 parts by mass, and particularly preferably 3 to 150 parts by mass, per 100 parts by mass of the content of the flake-effect pigment (B), described later, from the standpoint of obtaining a coating film with excellent metallic luster. The rheology control agent is also preferably a cellulose-based rheology control agent.

The rheology control agent (A) may be used singly, or in a combination of two or more kinds.

The flake-effect pigment (B) for use in the effect pigment dispersion (Y) preferably contains an effect pigment obtained by coating a transparent or translucent flake base material with a metal oxide, from the standpoint of imparting pearl luster to the multilayer coating film.

The transparent or translucent flake base material as used here refers to a flake base material, such as natural mica, synthetic mica, glass, iron oxide, aluminum oxide, or various metal oxides. The effect pigment refers to an effect pigment obtained by coating the surface of the flake base material with a metal oxide having a refractive index different from that of the flake base material. Examples of metal oxides include titanium oxide and iron oxide. The effect pigment can express different interference colors depending on the thickness of the metal oxide.

In the present invention, in particular, an effect pigment that has a black color can be used in the flake-effect pigment. Preferable examples of metal Oxides also include metal oxides that at least partly contain iron (Fe); and Metal oxides that contain one, or two or more metals selected, as desired, from titanium, cobalt, nickel, manganese, copper, tin, chromium, zirconium, and the like as an oxide of metal other than iron (Fe).

Additionally, examples of effect pigments that have a black color include substoichiometric titanium oxide and/or substoichiometric iron oxide, which are effect pigments with low lightness that are obtained by coating the surface with titanium oxide and/or iron oxide, and reducing part of the titanium oxide coating and/or iron oxide coating in a low-oxygen atmosphere. Effect pigments with low lightness in the color gamut from brownish-red to black, to blue can be obtained by changing, for example, the type of reducing agent and calcination temperature in the reduction step.

Specifically, examples of flake-effect pigments include the following metal-oxide-coated mica pigments, metal-oxide-coated alumina flake pigments, metal-oxide-coated glass flake pigments, and metal-oxide-coated silica flake pigments.

The metal-oxide-coated mica pigments are a pigment obtained by coating the surface of a base material, such as natural mica or synthetic mica, with a metal oxide. Natural mica is a flake base material obtained by pulverizing mica from ore. Synthetic mica is synthesized by heating an industrial material, such as $SiO_2$, $MgO$, $Al_2O_3$, $K_2SiF_6$, or $Na_2SiF_6$; melting the material at a high temperature of about 1500° C.; and cooling the melt for crystallization. When compared with natural mica, synthetic mica contains fewer impurities, and has a more homogeneous size and thickness. Specifically, known examples of synthetic-mica base materials include fluorophlogopite ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$), and LiNa taeniolite ($LiMg_2LiSi_4O_{10}F_2$).

The metal-oxide-coated alumina flake pigments are obtained by coating the surface of alumina flakes used as a base material with a metal oxide. Alumina flakes refer to flaky (thin) aluminum oxides, which are transparent and colorless. Alumina flakes do not necessarily consist of only aluminum oxide, and may contain other metal oxides.

The metal oxide-coated glass flake pigments are obtained by coating the surface of flake glass used as a base material with a metal oxide. The metal-oxide-coated glass flake pigments cause intense light reflection because of the smooth surface of the base material.

The metal-oxide-coated silica flake pigments are obtained by coating flake silica, which is a base material with a smooth surface and a uniform thickness, with a metal oxide.

The flake-effect pigments may be those surface-treated to enhance dispersibility, water resistance, chemical resistance, weatherability, and the like.

The flake-effect pigments are preferably those that have an average particle size of 5 to 30 μm, in particular, 7 to 25 μm, from the standpoint of excellent distinctness of image and pearl luster of the obtained coating film. The particle size as used here refers to the median size of volume-based particle size distribution as measured by a laser diffraction scattering method using a Microtrac MT3300 particle size distribution analyzer (trade name, produced by Nikkiso Co., Ltd.).

The content of the flake-effect pigment (B) in the effect pigment dispersion (Y) is preferably 1 to 90 parts by Mass, particularly 3 to 80 parts by mass, and more preferably 5 to 70 parts by mass, per 100 parts by mass of the total solids of the effect pigment dispersion (Y) from the standpoint of excellent distinctness of image and pearl luster of the obtained coating film.

The effect pigment dispersion (Y) may optionally contain a surface adjusting agent (C), an organic solvent, a pigment dispersant, an antisettling agent, an antifoaming agent, an ultraviolet absorber, and a light stabilizer, in addition to water, the rheology control agent (A), and the flake-effect pigment (B) described above.

The surface adjusting agent (C) is for use in facilitating uniform orientation of the dispersed-in-water flake-effect pigment (B) on the substrate when the effect pigment dispersion (Y) is applied to the substrate.

The surface adjusting agent (C) for use may be any known surface adjusting agent, without limitation. Examples include surface adjusting agents such as silicone-based surface adjusting agents, acrylic-based surface adjusting agents, vinyl-based surface adjusting agents, fluorine-based surface adjusting agents, and acetylene-dial-based surface adjusting agents. These surface adjusting agents may be used singly, or in a combination of two or more.

Examples of commercially available surface adjusting agent (C) include BYK series (produced by BYK-Chemie), Tego series (produced by Evonik), Glanol series and Polyflow series (produced by Kyoeisha Chemical Co., Ltd.), and DISPARLON series (produced by Kusumoto Chemicals, Ltd.).

The surface adjusting agent (C) is preferably a silicone-based surface adjusting agent, an acrylic-based surface adjusting agent, or an acetylene-diol-based surface adjusting agent from the standpoint of, for example, pearl luster and water resistance of the obtained coating film. Silicone-based surface adjusting agents for use include polydimethylsiloxane and modified silicone obtained by modifying polydimethylsiloxane. Examples of modified silicones include polyether-modified silicone, acrylic-modified silicone, and polyester-modified silicone.

The effect pigment dispersion (Y) may contain a base resin, a crosslinking agent, and a dispersion resin, from the standpoint of adhesion and storage stability of the obtained coating film.

Examples of base resins include acrylic resins, polyester resins, alkyd resins, and urethane resins.

Examples of crosslinking agents include melamine resin, melamine resin derivatives, urea resin, (meth)acrylamide, polyaziridine, polycarbodiimide, and blocked or unblocked polyisocyanate compounds. These may be used singly, or in a combination of two or more.

The dispersion resin for use include existing dispersion resins, such as acrylic resins, epoxy resins, polycarboxylic acid resin, and polyester resins.

When the effect pigment dispersion (Y) contains resin components, such as a base resin, a crosslinking agent, and a dispersion resin, the total content of the resins is preferably 0.01 to 500 parts by mass, more preferably 5 to 300 parts by mass, and still more preferably 10 to 200 parts by mass, per 100 parts by mass of the flake-effect pigment.

The effect pigment dispersion (Y) may optionally contain other flake-effect pigments, coloring pigments, extender pigments, and like pigments, in addition to the flake-effect pigment (B).

Examples of flake-effect pigments other than the flake-effect pigment (B) include aluminum flake pigments, and vapor-deposition metal flake pigments.

Specific examples of coloring pigments include, although not particularly limited to, inorganic pigments, such as metal oxide complex pigments including titanium yellow and transparent iron oxide pigments; organic pigments, such as azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, indanthrone pigments, dioxazine pigments, threne pigments, and indigo pigments; and carbon black pigments. These pigments may be used singly, or in a combination of two or more.

Examples of extender pigments include talc, silica, calcium carbonate, barium sulfate, and zinc white (zinc oxide). These extender pigments may be used singly, or in a combination of two or more.

The effect pigment dispersion (Y) is prepared by mixing and dispersing the above components. From the standpoint of obtaining a coating film excellent in pearl luster and low graininess, the solids content during coating is preferably adjusted to 0.1 to 15 mass %, and preferably 0.2 to 5 mass %, based on the effect pigment dispersion (Y).

From the standpoint of obtaining a coating film excellent in pearl luster, the proportion (solids content by mass) of each component of the effect pigment dispersion (Y) preferably falls within the following ranges.

Based on the effect pigment dispersion (Y), the rheology control agent (A) is present in an amount of 0.01 to 5 mass %, preferably 0.05 to 3 mass %, and more preferably 0.1 to 2 mass %, on a solids content basis, the flake-effect pigment (B) is present in an amount of 0.05 to 10 mass %, preferably 0.1 to 7 mass %, and more preferably 0.2 to 5 mass %, and the surface adjusting agent (C) is present in an amount of 0 to 5 mass %, preferably 0 to 3 mass %, and more preferably 0.1 to 3 mass %.

The viscosity of the effect pigment dispersion (Y) at a temperature of 20° C. as measured with a Brookfield-type viscometer at 60 rpm after 1 minute (also referred to as the "B60 viscosity" in this specification) is preferably 50 to 900 mPa·s, in particular 100 to 800 mPa·s, from the standpoint of obtaining a coating film excellent in pearl luster. The viscometer for use is a VDA-type digital Vismetron viscometer (Shibaura System Co. Ltd.; Brookfield-type viscometer).

The effect pigment dispersion (Y) can be applied by a method such as electrostatic spraying, air spraying, or airless spraying. In the method for forming a multilayer coating film of the present invention, rotary-atomization-type electrostatic spraying is particularly preferable.

The film thickness 30 seconds after the effect pigment dispersion (Y) has been adhered to the substrate is preferably 3 to 100 μm, more preferably 4 to 80 μm, and still more preferably 5 to 60 μm, from the standpoint of obtaining a coating film excellent in pearl luster.

The film thickness of the effect coating film on a dry film basis is preferably 0.05 to 3 μm, more preferably 0.1 to 2.5 μm, and particularly preferably 0.2 to 2 μm, from the standpoint of obtaining a coating film excellent in pearl luster. In this specification, "film thickness on a dry film basis" means the thickness of a cured dry film obtained by applying a thermosetting paint or dispersion to form an uncured coating film, and subjecting the uncured coating film to baking treatment. The film thickness on a dry film basis may be measured, for example, in accordance with JIS K 5600-1-7 (1999).

On the colored coating film obtained by applying the colored paint (X), the effect pigment dispersion (Y) is applied to form an effect coating film. The effect pigment dispersion (Y) can be applied to a coating film that has been dried or cured by heating after being formed by applying the colored paint. However, from the standpoint of adhesion and water resistance of the multilayer coating film, it is preferable to form a colored coating film by applying the colored paint (X), and to apply the effect pigment dispersion (Y) to the formed, uncured coating film to form an effect coating film.

The effect coating film formed by applying the effect pigment dispersion (Y) can be dried or cured by heating. However, from the standpoint of adhesion and water resistance of the multilayer coating film, it is preferable to apply the clear paint (Z), described later, to an uncured effect coating film.

3. Step (3)

In step (3), the clear paint (Z) is applied to the effect coating film formed by the effect pigment dispersion (Y).

Clear Paint (Z)

The clear paint (Z) for use may be any known thermosetting clear-coat paint compositions. Examples of the thermosetting clear-coat paint compositions include those containing a base resin having crosslinkable functional groups and a curing agent, such as organic solvent-based thermosetting paint Compositions, aqueous thermosetting paint compositions, and powdery thermosetting paint compositions.

Examples of the crosslinkable functional groups contained in the base resin include a carboxyl group, a hydroxy group, an epoxy group, a silanol group, and the like. Examples of the type of the base resin include acrylic resin, polyester resin, alkyd resin, urethane resin, epoxy resin, fluorine resin, and the like. Examples of the curing agent include polyisocyanate compounds, blocked polyisocyanate compounds, melamine resin, urea resin, carboxy-containing compounds, carboxy-containing resin, epoxy-containing resin, epoxy-containing compounds, and the like.

The combination of the base resin and the curing agent for the clear paint (Z) is preferably a carboxy-containing resin and an epoxy-containing resin, a hydroxy-containing resin and a polyisocyanate compound, a hydroxy-containing resin and a blocked polyisocyanate compound, a hydroxy-containing resin and melamine resin, and the like.

Further, the clear paint (Z) may be a one-component paint or a multi-component paint, such as a two-component paint. For all of these paints, the combination of the base resin and the curing agent may be used.

In particular, the clear paint (Z) is preferably a two-component clear paint containing the following hydroxy-containing resin and a polyisocyanate compound, in terms of the adhesion of the obtained coating film.

As the hydroxy-containing resin, previously known resins can be used without limitation, as long as they contain hydroxyl groups. Examples of the hydroxy-containing resin include hydroxy-containing acrylic resins, hydroxy-containing polyester resins, hydroxy-containing polyether resins, hydroxy-containing polyurethane resins, and the like; preferably hydroxy-containing acrylic resins and hydroxy-containing polyester resins; and particularly preferably hydroxy-containing acrylic resins.

The hydroxy value of the hydroxy-containing acrylic resin is preferably within the range of 80 to 200 mg KOH/g, and more preferably 100 to 180 mg KOH/g, in terms of obtaining a coating film with excellent scratch resistance and water resistance.

The weight average molecular weight of the hydroxy-containing acrylic resin is preferably within the range of 2500 to 40000, and more preferably 5000 to 30000, in terms of obtaining a coating film with acid resistance and smoothness.

In this specification, the weight average molecular weight refers to a value calculated from a chromatogram measured by gel permeation chromatography based on the molecular weight of standard polystyrene. For the gel permeation chromatography, "HLC812GPC" (produced by Tosoh Corporation) Was used. The measurement was conducted using four columns: "TSKgel G-4000HXL," "TSKgel-3000HXL," "TSKgel G-2500HXL," and "TSKgel G-2000HXL" (trade names, all produced by Tosoh Corporation) under the conditions of mobile phase: tetrahydrofuran; measuring temperature: 40° C.; flow rate: 1 cc/min; and detector: RI.

The glass transition temperature of the hydroxy-containing acrylic resin is in the range of −40° C. to 20° C., and particularly preferably −30° C. to 10° C. When the glass transition temperature is −40° C. or more, sufficient coating film hardness is ensured. When the glass transition temperature is 20° C. or less, the coating surface smoothness of the coating film is maintained.

A polyisocyanate compound is a compound having at least two isocyanate groups in one molecule. Examples include aliphatic polyisocyanates, alicyclic polyisocyanates, aliphatic-aromatic polyisocyanates, aromatic polyisocyanates, derivatives of these polyisocyanates, and the like.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and 2,6-diisocyanatomethyl hexanoate (common name: lysine diisocyanate); aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, methylenebis(4,1-cyclohexanediyl)diisocyanate (common name: hydrogenated MDI), and norbornane diisocyanate; alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1) heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1) heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aliphatic-aromatic polyisocyanates include aliphatic-aromatic diisocyanates, such as methylenebis(4,1-phenylene)diisocyanate (common name: MDI), 1,3- or 1,4-xylylene diisocyanate or mixtures thereof, ω,ω'-diisocyanato-1,4- and 1,3- or 1,4-bis(1-isocyanato-1-methylethyl) benzene (common name: tetramethylxylylene diisocyanate) or mixtures thereof; aliphatic-aromatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-biphenyldiisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; aromatic tetraisocyanates, such as 4,4'-diphenylmethane-2, 2',5,5'-tetraisocyanate; and the like.

Examples of polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), crude TDI, and the like, of the above-mentioned polyisocyanates. These polyisocyanate derivatives may be used singly, or in a combination of two or more.

The above polyisocyanates and derivatives thereof may be used singly, or in a combination of two or more.

Among the aliphatic diisocyanates, hexamethylene diisocyanate compounds are preferably used, and among the alicyclic diisocyanates, 4,4'-methylenebis(cyclohexylisocyanate) is preferably used. Of these, derivatives of hexamethylene diisocyanate are particularly the most preferable, in terms of adhesion, compatibility, and the like.

As the polyisocyanate compound, a prepolymer is also usable that is formed by reacting the polyisocyanate cr a derivative thereof with a compound having active hydrogen, such as hydroxy or amino, and reactive to the polyisocyanate under conditions such that the isocyanate groups are present in excess. Examples of the compound reactive to the polyisocyanate include polyhydric alcohols, low-molecular-weight polyester resins, amine, water, and the like.

The polyisocyanate compound for use may be a blocked polyisocyanate compound in which some or all of the isocyanate groups of the above polyisocyanate or a derivative thereof are blocked with a blocking agent.

Examples of the blocking agents include phenols, such as phenol, cresol, xylenol, nitrophenol, ethylphenol, hydroxydiphenyl, butylphenol, isopropylphenol, nonylphenol, octylphenol, and methyl hydroxybenzoate; lactam compounds, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, acetic acid amide, stearic acid amide, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamate esters, such as phenyl N-phenylcarbamate; imines, such as ethyleneimine and propyleneimine; sulfites, such as sodium bisulfite and potassium bisulfite; azole-based compounds; and the like. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

When blocking is performed (a blocking agent is reacted), it can be performed by optionally adding a solvent. As the solvent used in the blocking reaction, a solvent that is not reactive with an isocyanate group is preferably used. Examples include ketones, such as acetone and methyl ethyl ketone; esters, such as ethyl acetate; N-methyl-2-pyrrolidone (NMP); and like solvents.

The polyisocyanate compounds can be used singly, or in a combination of two or more. In the present invention, the equivalent ratio of the hydroxy groups in the hydroxy-containing resin to the isocyanate groups in the polyisocyanate compound (OH/NCO) is preferably within the range of 0.5 to 2, and more preferably 0.8 to 1.5, in terms of the curability, scratch resistance, and the like of the coating film.

When a two-component clear paint containing a hydroxy-containing resin and an isocyanate-containing compound is used as the clear paint (Z), a state in which the hydroxy-containing resin and the polyisocyanate compound are separately present is preferable in terms of storage stability. They are mixed and prepared into a two-component composition immediately before use.

The clear paint (Z) may further suitably and optionally contain additives, such as a solvent (e.g., water and organic solvents), a curing catalyst, an antifoaming agent, and an ultraviolet absorber.

The clear paint (Z) may suitably contain a color pigment within a range that does not impair transparency. As the color pigment, conventionally known pigments for ink or paints can be used singly, or in a combination of two or more. The amount thereof to be added may be suitably determined; however, it is 30 parts by mass or less, and more preferably 0.01 to 10 parts by mass, based on 100 parts by mass of the vehicle-forming resin composition contained in the clear paint (Z).

The form of the clear paint (Z) is not particularly limited. The clear paint (Z) is generally used as an organic solvent-based paint composition. Examples of the organic solvent used in this case include various organic solvents for paints, such as aromatic or aliphatic hydrocarbon solvents, ester solvents, ketone solvents, ether solvents, and the like. As the organic solvent used here, the one used in the preparation of the hydroxy-containing resin may be used as is, or other organic solvents may be further suitably added.

The solids concentration of the clear paint (Z) is preferably about 30 to 70 mass %, and more preferably about 40 to 60 mass %.

The clear paint (Z) is applied to the effect coating film. The coating of the clear paint (Z) is not particularly limited, and the same method as those for the colored paint may be used. For example, the clear paint (Z) can be applied by a coating method, such as air spray coating, airless spray coating, rotary atomization coating, or curtain coating. In these coating methods, an electrostatic charge may be optionally applied. Among these, rotary atomization coating using an electrostatic charge is preferable. The coating amount of the clear paint (Z) is generally preferably an amount in which the cured film thickness is about 10 to 50 μm.

Moreover, when the clear paint (Z) is applied, it is preferable to suitably adjust the viscosity of the clear paint (Z) within a viscosity range suitable for the coating method. For example, for rotary atomization coating using an electrostatic charge, it is preferable to suitably adjust the viscosity of the clear paint (Z) within the range of about 15 to 60 seconds measured by a Ford cup No. 4 viscometer at 20° C. using a solvent, such as an organic solvent.

4. Additional Step and Characteristics of Multilayer Coating Film

In the present invention, three coating films, i.e., the uncured colored coating film formed by applying the colored paint (X), the uncured effect coating film formed by applying the effect pigment dispersion (Y), and the uncured clear coating film formed by applying the clear paint (Z), are heated to separately or simultaneously cure these coating films. From the viewpoint of adhesion properties or water resistance of the multilayer coating film, it is preferable that the three uncured coating films, i.e., the uncured colored coating film, uncured effect coating film, and uncured clear coating film, are simultaneously cured by heating.

Heating can be performed by a known means. For example, a drying furnace, such as a hot-blast furnace, an electric furnace, or an infrared beam heating furnace, can be used. The heating temperature is preferably within the range of 70 to 150° C., and more preferably 80 to 140° C. The heating time is not particularly limited; however, it is preferably within the range of 10 to 40 minutes, and more preferably 20 to 30 minutes.

In a multilayer coating film forming method comprising applying the colored paint (X) to form a colored coating film (step (1)), applying the effect pigment dispersion (Y) of the present invention to the formed colored coating film to form an effect coating film (step (2)), and applying the clear paint (Z) to the formed effect coating film to form a clear coating film (step. (3)), the multilayer coating film to be obtained is such that the Y value (Y5) representing a luminance in the XYZ color space based on the spectral reflectance of light illuminated at an angle of 45 degrees with respect to the coating film and received at an angle of 5 degrees deviated from the specular reflection light in the incident light direction is 50 or more, and preferably 65 or more; and the L* value (L*25) representing the lightness in the L*a*b* color space when light illuminated at an angle of 45 degrees with respect to the coating film is received at an angle of 25 degrees deviated from the specular reflection light in the incident light direction is 25 or less, and preferably 22 or less.

The value Y5 is a luminance in the XYZ color space based on the spectral reflectance of light illuminated at an angle of 45 degrees with respect to the coating film and received at an angle of 5 degrees deviated from the specular reflection light in the incident light direction. When the value Y5 is less than 50, the multilayer coating film has poor luster.

L*25 Value

The L*25 value refers to lightness in the highlight, and is an L* value determined by irradiating an object with measurement light at an angle of 45 degrees to an axis perpendicular to the plane of the object measured with a multi-angle spectrophotometer ("MA-68II," trade name, produced by X-Rite Inc.), and measuring the light received at an angle of 25 degrees from the specular reflectance angle in the direction of the measurement light. A smaller L*25 indicates less lightness and better blackness of the obtained multilayer coating film. An L*25 value exceeding 25 indicates that the blackness of the multilayer coating film is impaired.

The present invention may also adopt the following embodiments.

[1] A method for forming a multilayer coating film, the method comprising the following steps (1) to (3):
(1) applying a colored paint (X) to a substrate to form a colored coating film whose lightness L* value in an L*a*b* color space is 5 or less,
(2) applying an effect pigment dispersion (Y) to the colored coating film formed in step (1) to form an effect coating film, and
(3) applying a clear paint (Z) to the effect coating film formed in step (2) to form a clear coating film,
wherein
the effect pigment dispersion (Y) contains water, a rheology control agent (A), and a flake-effect pigment (B), the flake-effect pigment (B) being an effect pigment in which a transparent or translucent base material is coated with a metal oxide, the effect pigment dispersion (Y) having a solids content of 0.1 to 15 mass %,
the obtained multilayer coating film has a Y value (Y5) of 50 or more, the Y value (Y5) representing a luminance in an XYZ color space based on spectral reflectance when light illuminated at an angle of 45 degrees with respect to the multilayer coating film is received at an angle of 5 degrees deviated from specular reflection light in the incident light direction, and
the obtained multilayer coating film has a lightness L* value (L*25) of 25 or less in the L*a*b* color space when light illuminated at an angle of 45 degrees with respect to the multilayer coating film is received at an angle of 25 degrees deviated from specular reflection light in the incident light direction.

[2] The method for forming a multilayer coating film according to [1], wherein the flake-effect pigment (B) contains an effect pigment that has a black color.

[3] The method for forming a multilayer coating film according to [1] or [2], wherein the effect pigment that has a black color contains an oxide of one, or two or more metals selected from iron, titanium, cobalt, nickel, manganese, copper, tin, chromium, zirconium, and the like.

[4] The method for forming a multilayer coating film according to any one of [1] to [3], wherein the flake-effect pigment (B) is a metal-oxide-coated mica pigment, a metal-oxide-coated alumina flake pigment, a metal-oxide-coated glass flake pigment, or a metal-oxide-coated silica flake pigment.

[5] The method for forming a multilayer coating film according to any one of [1] to [4], wherein the content of the flake-effect pigment (B) is 1 to 90 parts by mass, per 100 parts by mass of the total solids content in the effect pigment dispersion (Y).

[6] The method for forming a multilayer coating film according to any one of [1] to [5], wherein the effect pigment dispersion (Y) further contains a surface adjusting agent (C).

[7] The method for forming a multilayer coating film according to any one of [1] to [6], wherein the colored paint (X) contains an acrylic resin, a polyester resin, an epoxy resin, or a urethane resin.

[8] The method for forming a multilayer coating film according to any one of [1] to [7], wherein the colored paint (X) contains a black color pigment.

[9] The method for forming a multilayer coating film according to any one of [1] to [8], wherein the colored paint (X) contains perylene black, carbon black, and/or a carbon nanotube.

[10] The method for forming a multilayer coating film according to any one of [1] to [9], wherein the colored paint (X) contains carbon black.

[11] The method for forming a multilayer coating film according to any one of [1] to [10], wherein the rheology control agent (A) contains one, or two or more members of a mineral-based rheology control agent, a polyacrylic-acid-based rheology control agent, and a cellulose-based rheology control agent.

[12] The method for forming a multilayer coating film according to any one of [1] to [11], wherein the content of the rheology control agent (A) is 2 to 270 parts by mass, per 100 parts by mass of the content of the flake-effect pigment (B).

[13] The method for forming a multilayer coating film according to any one of [1] to [12], wherein the effect coating film has a thickness of 0.05 to 3 μm on a dry film basis.

[14] The method for forming a multilayer coating film according to any one of [1] to [13], wherein the clear paint (Z) is a two-component clear paint that contains a hydroxy-containing resin and a polyisocyanate compound.

[15] The method for forming a multilayer coating film according to any one of [1] to [14], comprising simultaneously curing three uncured coating films that are the colored coating film, the effect coating film, and the clear coating film.

EXAMPLES

The present invention is more specifically explained below with reference to Examples and Comparative Examples. However, the present invention is not limited to the following Examples. Note that "part (s)" and "%" are based on mass.

Preparation of Effect Pigment Dispersion

Production Example 1

18.8 parts (0.38 parts as solids content) of rheology control agent (A-1) (trade name: Rheocrysta, solids content=2.0%, a cellulose nanofiber dispersed in water, produced by Dai-Ichi Kogyo Seiyaku Co., Ltd.), 81.3 parts of distilled water, 1.4 parts of Xirallic (registered trademark) NXT M260-60 WNT Panthera Silver (trade name: alumina flake pigment coated with metal oxide containing iron titanate ($FeTiO_3$), black, Merck & Co., Inc., average particle size: 20 μm), 0.9 parts of acrylic resin aqueous dispersion (R-1) (solids content: 0.27 parts) (Note 3), 0.5 parts of surface adjusting agent (C-1) (solids content: 0.5 parts) (Note 4), 0.005 parts of dimethylethanolamine, and 0.5 parts of ethylene glycol monobutyl ether were added, stirred, and mixed, thereby obtaining an effect pigment dispersion (Y-1).

Production Examples 2 to 17

Effect pigment dispersions (Y-2) to (Y-17) were obtained in the same manner as in Production Example 1, except that the formulations shown in Table 1 were used.

The Notes in Table 1 are as follows.
(Note 1) Rheology control agent (A-2): A cellulose nanofiber aqueous dispersion obtained by mechanically defibrating a slurry of oxidized pulp treated by a known oxidation method using the catalyst TEMPO (2,2,6,6-tetramethylpiperidine 1-oxyl radical) was passed through an ion exchange column, and neutralized with dibutylamine for use. Solids content: 2 mass %.
(Note 2) Rheology control agent (A-3): solids content: 28 mass %, trade name: "Acrysol ASE-60," polyacrylic-based rheology control agent produced by The Dow Chemical Company.
(Note 3) Acrylic resin aqueous dispersion (R-1), which was produced in the following manner.

128 parts of deionized water and 2 parts of "Adeka Reasoap SR-1025" (trade name: Adeka Corp., emulsifying agent, active ingredient: 25%) were placed into a reactor equipped with a thermometer, a thermostat, a stirrer, a reflux condenser, a nitrogen inlet tube, and a dropping funnel, and the mixture was mixed and stirred in a nitrogen stream, and heated to 80° C.

Subsequently, 1% of the total core section monomer emulsion described below and 5.3 parts of a 6% ammonium persulfate aqueous solution were introduced into the reactor, and the mixture was maintained at 80° C. for 15 minutes. Thereafter, the remaining core section monomer emulsion was added dropwise into the reactor kept at the same temperature over a period of 3 hours. After completion of the dropwise addition, the mixture was aged for 1 hour. Subsequently, the shell portion monomer emulsion described below was added dropwise over a period of 1 hour, followed by aging for 1 hour. Thereafter, the mixture was cooled to 30° C. while gradually adding 40 parts of a 5% 2-(dimethylamino)ethanol aqueous solution to the reactor, and discharged while being filtered through a 100-mesh nylon cloth, thereby obtaining an acrylic resin aqueous dispersion (R-1) having an average particle diameter of 100 nm, and a solids content of 30%. The obtained acrylic resin aqueous dispersion had an acid value of 33 mg KOH/g, and a hydroxy value of 25 mg KOH/g.

Core portion monomer emulsion: 40 parts of deionized water, 2.8 parts of "Adekaria Soap SR-1025," 2.1 parts of methylene-bis-acrylamide, 2.8 parts of styrene, 16.1 parts of methyl methacrylate, 28 parts of ethyl acrylate, and 21 parts of n-butyl acrylate were mixed and stirred, thereby obtaining a core portion monomer emulsion.

Shell portion monomer emulsion: 17 parts of deionized water, 1.2 parts of "Adekaria Soap SR-1025", 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate were mixed and stirred, thereby obtaining a shell portion monomer emulsion.
(Note 4) Surface adjusting agent (C-1): solids content=100 mass %, trade name "BYK348" produced by BYK-Chemie, silicone-based surface adjusting agent.
(Note 5) Surface adjusting agent (C-2): solids content=48 mass %, trade name: "Polyflow WS-314" produced by Kyoeisha Chemical Co., Ltd., acrylic-based surface adjusting agent.
(Note 6) Acrylic resin solution (R-2), which was produced in the following manner.

35 parts of propylene glycol monomethyl ether and 25 parts of propylene glycol monobutyl ether were placed in a reactor equipped with a thermometer, a thermostat, a stirrer, a reflux condenser, and a dropping funnel; and the content was heated with stirring to maintain the temperature at 110° C. A mixture of 15 parts of "NF BISOMER S20W" (trade name, methoxy polyethylene glycol monomethacrylate produced by Daiichi Kogyo Seiyaku Co., Ltd.), 10 parts of 2-hydroxyethyl acrylate, 30 parts of methyl methacrylate, 15 parts of n-butyl acrylate, 5 parts of styrene, 20 parts of isobornyl acrylate, 5 parts of acrylic acid, 1 part of azobisisobutyronitrile, and 20 parts of propylene glycol monomethyl ether was added dropwise thereto over 3 hours. After the completion of dropwise addition, the content was aged at 110° C. for 30 minutes. Subsequently, an additional catalyst mixture of 15 parts of propylene glycol monomethyl ether and 0.5 parts of azobisisobutyronitrile was added dropwise over 1 hour. After aging at 110° C. for 1 hour, the content was cooled, thereby obtaining an acrylic resin solution (R-2) with a solids content of 50%.

(Note 7) Aluminium paste: solids content=20%, trade name: "STAPA IL HYDROLANS 1500" produced by Eckart.

(Note 8) Carbon paste: Carbon black (trade name: "Raven 5000" produced by Birla Carbon) and a tertiary amino group-containing pigment dispersion resin solution were added so that the solids Content was 30:70, followed by dispersion treatment by adding a neutralizer and deionized water to form a paste having a solids content of 15%.

(Note 9) Ultraviolet absorber: solids content=40%, trade name "Tinuvin 479-DW(N)" produced by BASE A.G.

(Note 10) Light stabilizer: solids content=50%, trade name "Tinuvin 123-DW(N)" produced by BASE A.G.

TABLE 1

| Production Example No. | | | 1 | 2 | 3 | 4 | 5 | 6 | 7 | 8 | 9 |
|---|---|---|---|---|---|---|---|---|---|---|---|
| Name of effect pigment dispersion | | | Y-1 | Y-2 | Y-3 | Y-4 | Y-5 | Y-6 | Y-7 | Y-8 | Y-9 |
| Formulation | Distilled watrer | | 81.3 | 81.3 | 81.3 | 73.8 | 97.7 | 81.3 | 81.3 | 81.3 | 81.3 |
| | Rheology control agent (A-1) | | 18.8 | 18.8 | 18.8 | | | 18.S | 18.8 | 18.S | 18.8 |
| | Rheology control agent (A-2) (Note 1) | | | | | 26.3 | | | | | |
| | Rheology control agent (A-3) (Note 2) | | | | | | 2.4 | | | | |
| | Flake affect pigment | A | 1.4 | 1.7 | 0.4 | 1.4 | 1.4 | 1.4 | 1.4 | 1.4 | |
| | | B | | | | | | | | | 3.9 |
| | | C | | | | | | | | | |
| | | D | | | | | | | | | |
| | | E | | | | | | | | | |
| | | F | | | | | | | | | |
| | Acrylic resin aqueous dispersion (R-1) (Note 3) | | 0.9 | 1.2 | 0.2 | 0.9 | 0.9 | 0.9 | 0.9 | | 2.6 |
| | Acrylic resin aqueous dispersion (R-2) (Note 6) | | | | | | | | | | |
| | Surface adjusting agent (C-1) (Note 4) | | 0.5 | 0.5 | 0.5 | 0.5 | 0.5 | 2.0 | | 0.5 | 0.5 |
| | Surface adjusting agent (C-2) (Note 5) | | | | | | | | 1.0 | | |
| | Aluminum paste (Note 7) | | | | | | | | | | |
| | Carbon paste (Note 8) | | | | | | | | | | |
| | Ultraviolet absorber (Note 9) | | | | | | | | | | |
| | Light stabilizer (Note 10) | | | | | | | | | | |
| | Dimethyl ethanol amine | | 0.005 | 0.005 | 0.005 | 0.005 | 0.005 | 0.005 | 0.005 | 0.005 | 0.005 |
| | Ethylene glycol monobutyl ether | | 0.5 | 0.5 | 0.5 | 0.5 | 0.5 | 0.5 | 0.5 | 0.5 | 0.5 |
| Characteristic value of effect pigment dispersion | B60 viscosity | | 566 | 541 | 532 | 560 | 462 | 527 | 563 | 534 | 538 |
| | Solids content wt % | | 2.5 | 2.9 | 1.3 | 2.6 | 2.7 | 3.9 | 2.4 | 2.2 | 5.1 |

| Production Example No. | | | 10 | 11 | 12 | 13 | 14 | 15 | 16 | 17 |
|---|---|---|---|---|---|---|---|---|---|---|
| Name of effect pigment dispersion | | | Y-10 | Y-11 | Y-12 | Y-13 | Y-14 | Y-15 | Y-16 | Y-17 |
| Formulation | Distilled watrer | | 81.3 | 81.3 | 81.3 | 81.3 | 79.9 | 64.9 | 63.9 | 81.3 |
| | Rheology control agent (A-1) | | 18.8 | 18.8 | 18.S | 18.8 | 16.5 | 33.0 | 33.0 | 18.8 |
| | Rheology control agent (A-2) (Note 1) | | | | | | | | | |
| | Rheology control agent (A-3) (Note 2) | | | | | | 1.2 | | | |
| | Flake affect pigment | A | | | | | 0.7 | 1.1 | 1.1 | 16.8 |
| | | B | | | | | | | | |
| | | C | 3.8 | | | | | | | |
| | | D | | 0.9 | | | | | | |
| | | E | | | 0.5 | | | | | |
| | | F | | | | 1.0 | | | | |
| | Acrylic resin aqueous dispersion (R-1) (Note 3) | | 2.5 | 0.6 | 0.4 | 0.7 | 2.9 | 1.9 | 1.9 | |
| | Acrylic resin aqueous dispersion (R-2) (Note 6) | | | | | | 0.3 | 0.4 | 0.4 | |

TABLE 1-continued

| | | | | | | | | | |
|---|---|---|---|---|---|---|---|---|---|
| | Surface adjusting agent (C-1) (Note 4) | 0.5 | 0.5 | 0.5 | 0.5 | 0.4 | 0.4 | 0.4 | 2.0 |
| | Surface adjusting agent (C-2) (Note 5) | | | | | | | | |
| | Aluminum paste (Note 7) | | | | | | 0.1 | 0.1 | |
| | Carbon paste (Note 8) | | | | | | | 0.1 | |
| | Ultraviolet absorber (Note 9) | | | | | | 0.4 | 0.4 | |
| | Light stabilizer (Note 10) | | | | | 0.3 | 0.3 | 0.3 | |
| | Dimethyl ethanol amine | 0.005 | 0.005 | 0.005 | 0.005 | 0.127 | 0.007 | 0.007 | 0.005 |
| | Ethylene glycol monobutyl ether | 0.5 | 0.5 | 0.5 | 0.5 | 0.5 | 0.5 | 0.5 | 0.5 |
| Characteristic value of effect pigment dispersion | B60 viscosity | 546 | 583 | 547 | 571 | 482 | 493 | 502 | 625 |
| | Solids content wt % | 5.0 | 1.9 | 1.5 | 2.0 | 2.8 | 3.2 | 3.2 | 16.1 |

Flake-effect pigment A: Xirallic ® NXT M260-60 WNT Panthera Silver (trade name: alumina flake pigment coated with metal oxide containing iron titanate (FeTiO$_3$); black; Merck & Co., Inc.; average particle size: 20 μm)
Flake-effect pigment B: Xirallic ® NXT Black WT (trade name: alumina flake pigment coated with metal oxide containing triiron tetraoxide (Fe$_3$O$_4$); black; Merck & Co., Inc.; average particle size: 18 μm)
Flake-effect pigment C: Iriodin ® 602 WNT (trade name: mica pigment coated with metal oxide containing iron titanate (FeTiO$_3$); black; Merck & Co., Inc.; average particle size: 19 μm)
Flake-effect pigment D: Xirallic ® T60-10 Crystal Silver (trade name: alumina flake pigment coated with titanium oxide; Merck & Co., Inc.; average particle size: 19 μm)
Flake-effect pigment E: Xirallic ® T61-10 Micro Silver (trade name: alumina flake pigment coated with titanium oxide; Merck & Co., Inc.; average particle size: 11 μm)
Flake-effect pigment F: Iriodin ® 103 WNT (trade name: mica pigment coated with titanium oxide; Merck & Co., Inc.; average particle size: 19 μm)

Production of Test Plate

Example 1

A cationic electrodeposition paint "Elecron 9400HB" (trade name, produced by Kansai Paint Co., Ltd., an amine-modified epoxy resin-based cationic resin containing a blocked polyisocyanate compound as a curing agent) was applied by electrodeposition to a degreased and zinc phosphate-treated steel plate (JISG3141, size: 400×300×0.8 mm) to a film thickness of 20 μm when cured. The resulting film was heated at 170° C. for 20 minutes to be cured by crosslinking, thereby obtaining substrate 1.

A colored paint (X-1) "WP-522H" (trade name, produced by Kansai Paint Co., Ltd., a polyester resin-based aqueous intermediate paint, L* value of the coating film to be obtained by addition of carbon black: 2) was applied to substrate 1 to a cured film thickness of 30 μm by electrostatic spraying using a rotary-atomization-type bell-shaped coating device. After the resulting film was allowed to stand for 3 minutes, preheating was performed at 80° C. for 3 minutes. Further, the effect pigment dispersion (Y-1) produced as described above was applied thereon to a dry coating film thickness of 0.5 μm using a Robot Bell (produced by ABB) at a booth temperature of 23° C. and a humidity of 68%.

The resulting coating was then allowed to stand for 3 Minutes at room temperature, and heated for 3 minutes at 60° C. using a hot-air-circulation-type dryer. Subsequently, a clear paint (Z-1) "KINO6500" (trade name, produced by Kansai Paint Co., Ltd., a hydroxy/isocyanate curable acrylic resin/urethane resin-based two-component organic solvent-based paint) was applied thereto to a dry coating film thickness of 30 μm using a Robot Bell (produced by ABB) at a booth temperature of 23° C. and a humidity of 68%. After coating, the resulting plate was allowed to stand at room temperature for 10 minutes, and then heated in a hot-air-circulation-type dryer at 140° C. for 30 minutes to simultaneously dry the multilayer coating films, thereby obtaining a test plate.

The film thickness of the dry coating film of the effect pigment dispersion was calculated from the following formula. The same calculation was used in the following Examples.

$$x = (sc*10000)/(S*sg)$$

x: film thickness [μm]
sc: coating solids content [g]
S: evaluation area of coating solids content [cm$^2$]
sg: coating film specific gravity [g/cm$^3$]

Examples 2 to 19 and Comparative Examples 1 and 2

The test plates of Examples 2 to 19 and Comparative Examples 1 and 2 were obtained in the same manner as in Example 1, except that the type of the colored paint, the type of the effect pigment dispersion, and the film thickness used in Example 1 were changed to those shown in Table 2.

The base paints (X-2) and (X-3) in Table 2 are the following.
(X-2): "WP-522H" (trade name, produced by Kansai Paint Co., Ltd., a polyester resin-based aqueous intermediate paint, L* value of the coating film to be obtained by addition of carbon black: 5)
(X-3): "WP-522H" (trade name, produced by Kansai Paint Co., Ltd., a polyester resin-based aqueous intermediate paint, L* value of the coating film to be obtained by addition of carbon black: 10)

Example 20

A cationic electrodeposition paint "Elecron 9400HB" was applied by electrodeposition to a degreased and zinc phosphate-treated steel plate (JISG3141, size: 400×300×0.8 mm) to a film thickness of 20 μm when cured. The resulting film was heated at 170° C. for 20 minutes to be cured by crosslinking, thereby obtaining an electrodeposition coating film. "TP-65 No. 8110" (trade name, produced by Kansai Paint Co., Ltd., a polyester resin-based aqueous intermediate paint, L* value of the coating film to be obtained: 20) was applied to the electrodeposition coating surface of the steel plate to a cured film thickness of 20 μm by electrostatic spraying using a rotary-atomization-type bell-shaped coating device. The resulting film was heated at 140° C. for 30 minutes to be cured by crosslinking, thereby forming an intermediate coating film. Substrate 2 was thus obtained.

"WBC-713T #202" (trade name, produced by Kansai Paint. Co., Ltd., an acryl/melamine resin aqueous base coating paint for automobile topcoats, L* value of the coating film to be obtained: 2) was applied as a colored paint (X-4) to substrate 2 to a cured film thickness of 10 μm by electrostatic spraying using a rotary-atomization-type bell-shaped coating device. After the resulting film was allowed to stand for 3 minutes, the effect pigment dispersion (Y-1) produced as described above was applied thereon to a dry coating film thickness of 0.5 μm using a Robot Bell (produced by ABB) at a booth temperature of 23° C. and a humidity of 68%.

The resulting coating was then allowed to stand for 3 minutes at room temperature, and heated for 3 minutes at 80° C. using a hot-air-circulation-type dryer. Subsequently, a clear paint (Z-1) "KINO6500" (trade name, produced by Kansai Paint Co., Ltd., a hydroxy/isocyanate curable acrylic resin/urethane resin-based two-component organic solvent-based paint) was applied thereto to a dry coating film thickness of 30 μm using a Robot Bell (produced by ABB) at a booth temperature of 23° C. and a humidity of 68%. After coating, the resulting plate was allowed to stand at room temperature for 10 minutes, and then heated in a hot-air-circulation-type dryer at 140° C. for 30 minutes to simultaneously dry the multilayer coating films, thereby obtaining a test plate.

Evaluation of Coating Film

The test plates obtained in the manner described above were evaluated based on the following criteria. Table 2 shows the results.

Y Value Representing Luminance:

The strength of the multi-reflection light of the illuminated light is represented by Y value, which represents a luminance in the XYZ color space. In particular, in this specification, the evaluation is made based on value Y5, i.e., the luminance of an angle deviated by 5° with respect to the specular reflection light in the incident direction, which is a characteristic of pearl luster.

Y-5: A luminance Y value (Y5) in the XYZ color space was calculated based on a spectral reflectance of light illuminated at an angle of 45 degrees with respect to a coating film and received at an angle of 5 degrees deviated from the specular reflection light in the incident light direction. The measurement and the calculation were performed using Gonio meter GCMS-4 (trade name, Murakami Color Research Laboratory Co., Ltd.).

L*25: The L*25 value refers to lightness determined by irradiating an object with measurement light at an angle of 45° to an axis perpendicular to the plane of the object measured with a multi angle spectrophotometer ("MA-68II," trade name, produced by X-Rite Inc.), and measuring the light received at an angle of 25° from the specular reflectance angle in the direction of the measurement light.

|  | Example | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Substrate | 1 | 1 | 1 | 1 | 1 | 1 | 1 | 1 | 1 | 1 | 1 |
| Colored paint | X-1 | X-1 | X-1 | X-1 | X-1 | X-1 | X-1 | X-1 | X-1 | X-1 | X-1 |
| Effect pigment dispersion | Y-1 | Y-2 | Y-3 | Y-4 | Y-5 | Y-6 | Y-7 | Y-8 | Y-9 | Y-10 | Y-11 |
| Film thickness of luster pigment dispersion (μm): | 0.5 | 0.6 | 0.3 | 0.5 | 0.5 | 0.5 | 0.5 | 0.4 | 0.8 | 0.8 | 0.5 |
| Calculation value L25 | 16.2 | 21.5 | 4.2 | 16.4 | 12.7 | 16.4 | 16.3 | 15.4 | 11.1 | 15.8 | 11.4 |
| Value Y5 | 222 | 249 | 72 | 218 | 97 | 218 | 221 | 236 | 87 | 95 | 160 |

|  | Example | | | | | | | | | Comparative Example | |
| --- | --- | --- | --- | --- | --- | --- | --- | --- | --- | --- | --- |
|  | 12 | 13 | 14 | 15 | 16 | 17 | 18 | 19 | 20 | 1 | 2 |
| Substrate | 1 | 1 | 1 | 1 | 1 | 1 | 1 | 1 | 2 | 1 | 1 |
| Colored paint | X-1 | X-1 | X-2 | X-2 | X-2 | X-1 | X-1 | X-1 | X-4 | X-3 | X-1 |
| Effect pigment dispersion | Y-12 | Y-13 | Y-1 | Y-4 | Y-12 | Y-14 | Y-15 | Y-16 | Y-1 | Y-1 | Y-17 |
| Film thickness of luster pigment dispersion (μm): | 0.4 | 0.8 | 0.5 | 0.5 | 0.4 | 0.8 | 0.9 | 0.9 | 0.5 | 0.5 | 3.1 |
| Calculation value L25 | 13.7 | 12.3 | 19.2 | 19.4 | 16.7 | 16.5 | 17.7 | 13.8 | 15.5 | 25.2 | 83.2 |
| Value Y5 | 143 | 108 | 228 | 224 | 149 | 214 | 286 | 225 | 218 | 233 | 276 |

The invention claimed is:

1. A method for forming a multilayer coating film, the method comprising the following steps (1) to (3):

(1) applying a colored paint (X) to a substrate to form a colored coating film whose lightness L* value in an L*a*b* color space is 5 or less, (2) applying an effect pigment dispersion (Y) to the colored coating film formed in step (1) to form an effect coating film, and (3) applying a clear paint (Z) to the effect coating film formed in step (2) to form a clear coating film, wherein the effect pigment dispersion (Y) contains water, a rheology control agent (A), and a flake-effect pigment (B), the flake-effect pigment (B) being an effect pigment in which a transparent or translucent base material is coated with a metal oxide, the effect pigment dispersion (Y) having a solids content of 0.1 to 15 mass %, the obtained multilayer coating film has a Y value (Y5) of 50 or more, the Y value (Y5) representing a luminance in an XYZ color space based on spectral reflectance when light illuminated at an angle of 45 degrees with respect to the multilayer coating film is received at an angle of 5 degrees deviated from specular reflection light in the incident light direction, and the obtained multilayer coating film has a lightness L* value (L*25) of 25 or less in the L*a*b* color space when light illuminated at an angle of 45 degrees with respect to the multilayer coating film is received at an angle of 25 degrees deviated from specular reflection light in the incident light direction.

2. The method for forming a multilayer coating film according to claim 1, wherein the flake-effect pigment (B) contains an effect pigment that has a black color.

3. The method for forming a multilayer coating film according to claim 1, wherein the content of the flake-effect pigment (B) is 1 to 90 parts by mass, per 100 parts by mass of the total solids content in the effect pigment dispersion (Y).

4. The method for forming a multilayer coating film according to claim 1, wherein the effect pigment dispersion (Y) further contains a surface adjusting agent (C).

5. The method for forming a multilayer coating film according to claim 1, wherein the colored paint (X) contains carbon black.

6. The method for forming a multilayer coating film according to claim 1, wherein the clear paint (Z) is a two-component clear paint that contains a hydroxy-containing resin and a polyisocyanate compound.

* * * * *